(12) United States Patent
Zhou

(10) Patent No.: US 12,552,690 B2
(45) Date of Patent: Feb. 17, 2026

(54) WATER PURIFIER

(71) Applicant: Guangdong Yimi Environmental Technology Co., Ltd., Dongguan (CN)

(72) Inventor: Qisong Zhou, Dongguan (CN)

(73) Assignee: Guangdong Yimi Environmental Technology Co., Ltd., Dongguan (CN)

( * ) Notice: Subject to any disclaimer, the term of this patent is extended or adjusted under 35 U.S.C. 154(b) by 439 days.

(21) Appl. No.: 18/241,154

(22) Filed: Aug. 31, 2023

(65) Prior Publication Data

US 2025/0074793 A1  Mar. 6, 2025

(51) Int. Cl.
*C02F 1/44* (2023.01)
*C02F 1/28* (2023.01)

(52) U.S. Cl.
CPC .............. *C02F 1/441* (2013.01); *C02F 1/283* (2013.01); *C02F 2201/002* (2013.01)

(58) Field of Classification Search
CPC .... C02F 1/441; C02F 1/283; C02F 2201/002; C02F 1/001; C02F 9/20
See application file for complete search history.

(56) References Cited

U.S. PATENT DOCUMENTS 7,658,840 B2 * 2/2010 Lisenko .................... C02F 9/20
  210/450
2004/0238423 A1 * 12/2004 Schmitt ................. B01D 61/10
  210/257.2

* cited by examiner

*Primary Examiner* — Waqaas Ali
(74) *Attorney, Agent, or Firm* — JEEN IP LAW, LLC

(57) ABSTRACT

The present disclosure discloses a water purifier including a membrane shell for installation and fixation, and a locking mechanism for locking and preventing loosening of a first class and a second class filter elements; a bottom surface of the membrane shell is provided with two first class filter element mounting seats, the first class filter element is connected to the first class filter element mounting seat by threads; one side of the first class filter element mounting seat is provide with a second class filter element mounting seat penetrating a bottom of the membrane shell; a bottom of the second class filter element mounting seat is provided with the second class filter element; an inner of the membrane shell is provided with a fix groove on one side of the second class filter element mounting seat; an inner of the fix groove is provided with a water pump.

7 Claims, 6 Drawing Sheets

WATER PURIFIER

TECHNICAL FIELD

The present disclosure relates to the field of water purifiers, and in particular, to a water purifier.

BACKGROUND

A water purifier, is known as a water purifying machine, is a device that deeply filters and purifies water according to its usage requirements. The commonly used water purifier refers to a small purifier used for household use. The function of the water purifier is to remove heavy metals, bacteria, sediment, rust, microorganisms, etc. from the water, and it has high accuracy. Water purifiers are not only suitable for areas with severe water quality, but can also filter out residual chlorine from conventional tap water and improve the taste of water.

In conventional water purifiers, PP cotton filter element, activated carbon filter element, RO (reverse osmosis) and other filter elements are generally used in combination. Due to a higher filtration accuracy of the last layer of RO permeate membrane, its length is often longer than the length of other filter elements. Currently, in the field of water purifiers, most water purifiers often use membrane shells larger than all filter element sizes to ensure their structural stability or appearance, which will cause some space waste. If it is a hanging structure, it often affects a user's operation, and in existing water purifiers, due to a continuous internal water pressure, the filter element often adopts a threaded connection to ensure installation sealing and convenience, and a continuous vibration will cause a problem that the filter element becomes loose.

SUMMARY

The purpose of the present disclosure is to provide a water purifier to solve the above problems.

The present disclosure achieves the above purpose through the following technical solutions:

a water purifier including a membrane shell for installation and fixation, and a locking mechanism for locking and preventing loosening of a first class filter element and a second class filter element; a bottom surface of the membrane shell is provided with two first class filter element mounting seats, the first class filter element is connected to the first class filter element mounting seat by threads; one side of the first class filter element mounting seat is provided with a second class filter mounting seat penetrating a bottom of the membrane shell; a bottom of the second class filter element mounting seat is provided with the second class filter mounting seat, an inner of the membrane shell is provided with a fix groove on one side of the second class filter element mounting seat, and an inner of the fix groove is provided with a water pump;

two first class filter elements and the first class filter element mounting seat are connected by the locking mechanism; the second class filter element mounting seat and the second class filter element are connected by the locking mechanism;

where the locking mechanism includes a toggle disk, a fix block, and a locking block; a front end of the first class filter element and a front end of the first class filter element mounting seat are both formed with a matching block; a hole is formed on the matching block which fits with the locking block, and a front end of the locking block is provided with the fix block, and the toggle disk is rotatably connected to the fix block.

In an embodiment of the present disclosure, the first class filter element includes a front composite filter element and a post carbon filter element, the second class filter element includes a reverse osmosis membrane filter element, and the reverse osmosis membrane filter element is vertically installed on a side position of the membrane shell.

By vertically installing the reverse osmosis membrane filter element on the side of the membrane shell, a reserved space of the fix groove can be used to install the water pump, which effectively saves an assembly space and improves a utilization rate of the overall space. At the same time, during installation and use, a flatness and comfort of the overall structure are ensured.

In an embodiment of the present disclosure, the water pump is connected to the membrane shell through a screw, and the second class filter element mounting seat and the first class filter element mounting seat are both connected to the water pump through a pipeline.

In an embodiment of the present disclosure, a length of the second class filter element is longer than a length of the first class filter element.

In this setting, the second class filter element often uses a RO reverse osmosis membrane, which limits its function and results in a longer length. Thus, in order to ensure an overall structural effect of the second class filter element and the first class filter element, the second class filter element mounting seat and the second class filter element are fixed on the side position of the membrane shell, rendering an enough space for the water pump to ensure an installation effect of the water pump, and ensuring a stability of the overall mechanism after the membrane shell is matched with the first class filter element and the second class filter element.

In an embodiment of the present disclosure, the locking block is an insertion block provided with two vertical rods, the locking block is inserted and interference-fit with the matching block, the fix block and the locking block are integrated formed.

This setting adopts an interference-fit to ensure a close fit between the two matching blocks, avoiding looseness and leakage of the first class filter element and second class filter element due to an internal water pressure.

In an embodiment of the present disclosure, the toggle disk is provided with a perspective window, and a position of the fix block corresponds to the perspective window of the toggle disk is provided with a scale.

In this setting, an installation date may be adjusted using a combination of the toggle disk and the fix block, which facilitates a visual understanding of the installation date during subsequent inspections, thereby determining whether replacement is necessary, reducing costs and improving practicality.

In an embodiment of the present disclosure, both the first class filter element and the second class filter element include a membrane shell and an inner frame, the inner frame is clamped inside the membrane shell, and an outer diameter of the inner frame is the same as an inner diameter of the membrane shell, and an inner diameter of the inner frame varies according to a size of a filter material. After adding the inner frame, the same membrane shell can match all reverse osmosis membranes of different sizes on the market.

In this embodiment of the present disclosure, the inner frame is a replaceable structure, so that when facing different specifications of reverse osmosis membranes (such as reverse osmosis membranes with models 2012, 3012, 3013, and 3213), inner frames with different specifications can be replaced according to the size of the filter material, and then fixed inside the membrane shell of the same specification, improving the device's adaptability to reverse osmosis membranes with different specifications and enhancing its practicality.

Compared with the prior art, the beneficial effects of the present disclosure are as follows:

1. Due to a frequent use of the RO reverse osmosis membrane in the second class filter element, its functionality is limited and its length is longer. In order to ensure an overall structural effect of the second class filter element and the first class filter element, the second class filter element mounting seat and the second class filter element are fixed on the side of the membrane shell, allowing a sufficient space for the water pump to ensure the installation effect of the water pump, effectively saving an assembly space, and improving a utilization rate of the overall space, and ensuring a stability of the overall mechanism after the membrane shell is matched with the first class and the second class filter elements;
2. After using the locking mechanism to tighten it, the filter element is prevented from losing threads after being impacted by an internal water pressure, thereby avoiding water leakage. At the same time, an installation date may be adjusted by a combination of the toggle disk and the fix block, which facilitates a visual understanding of the installation date during subsequent inspections, determine whether replacement is necessary, reduces costs and improves practicality;
3. Inner frames with different specifications can be replaced according to the size of the filter material, and then fixed inside the membrane shell of the same specification, improving the effectiveness of the device in adapting to different filter materials, thereby improving the practicality of the device.

BRIEF DESCRIPTION OF DRAWINGS

In order to provide a clearer explanation of the embodiment of the present disclosure or the technical solution in the prior art, a brief introduction will be given to the drawings required in the description of the embodiment or the prior art. It is evident that the drawings in the following description are only some embodiments of the present disclosure. For ordinary technical personnel in the art, other drawings can be obtained based on these drawings without any creative work.

REFERENCE NUMBER

Figure 1:
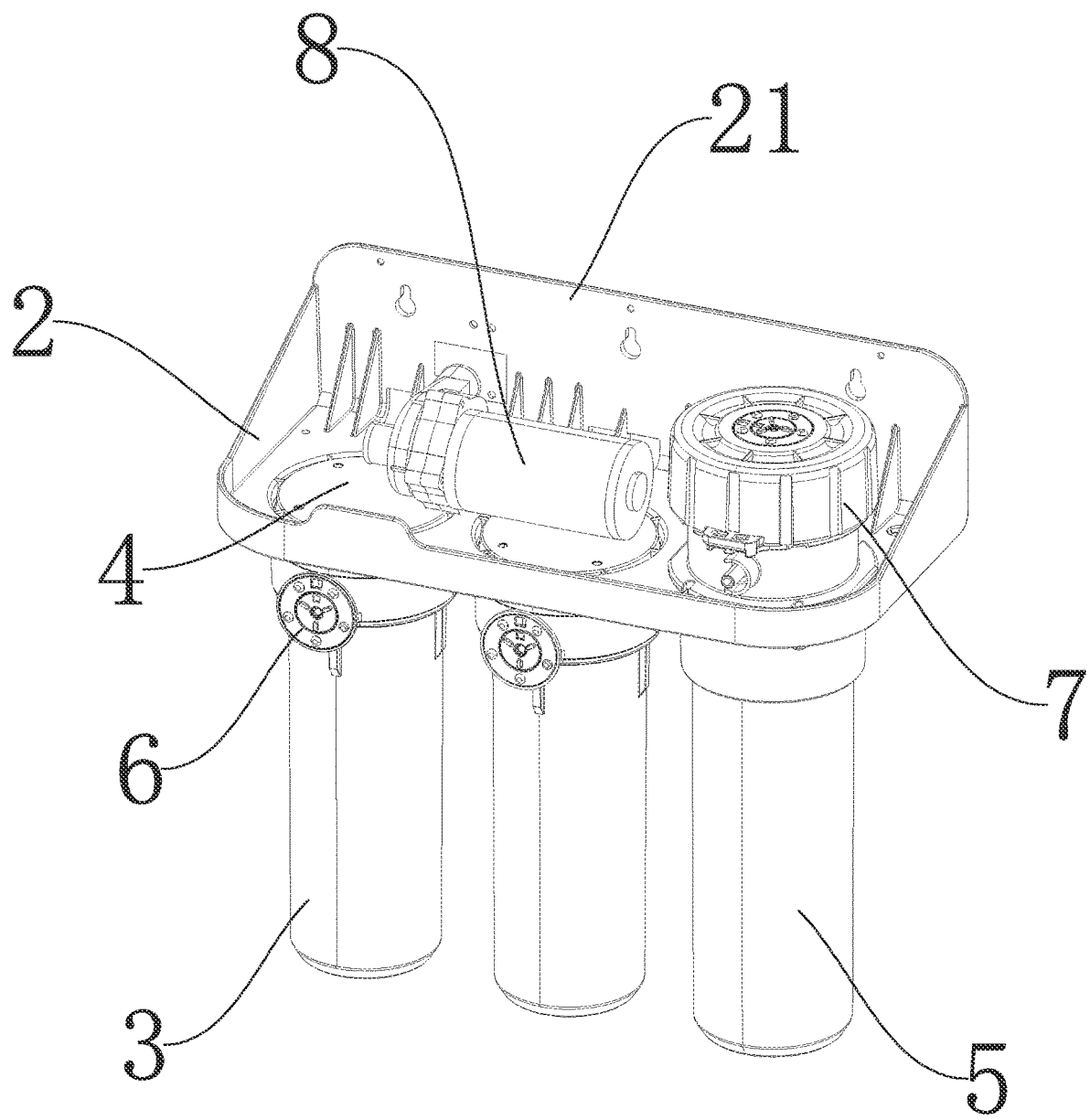
FIG. 1 is a structural schematic diagram of a water purifier according to the present disclosure.

2. Membrane shell; 3. First class filter element; 4. First class filter element mounting seat; 5. Second class filter element; 6. Locking mechanism; 7. Second class filter element mounting seat; 8. Water pump; 21. Fix groove; 31. Membrane shell; 32. Inner frame; 33. Filter material; 61. Toggle disk; 62. Fix block; 63. Locking block; 64. Matching block.

DETAILED DESCRIPTION

In the description of the present disclosure, it should be understood that the terms "center", "longitudinal", "lateral", "up", "down", "front", "back", "left", "right", "vertical", "horizontal", "top", "bottom", "inside", "outside", etc. indicate an orientation or a position relationship based on the orientation or position relationship shown in the drawings, only for a convenience of describing the present disclosure and simplifying the description, rather than indicating or implying that the device or component referred to must have a specific orientation, be constructed and operated in a specific orientation, therefore cannot be understood as a limitation on the present disclosure. In addition, terms "first", "second", etc. are only used to describe a purpose and cannot be understood as indicating or implying a relative importance or implying the quantity of technical features indicated. Therefore, features defined by "first", "second", etc. can explicitly or implicitly include one or more of these features. In the description of the present disclosure, unless otherwise stated, "multiple" means two or more.

In the description of the present disclosure, it should be noted that unless otherwise specified and limited, the terms "installation", "connection", and "connecting to" should be understood broadly, for example, they can be a fixed connection, a detachable connection, or an integrated connection; it can be a mechanical connection or an electrical connection; it can be directly connected, or an indirectly connected through an intermediate medium, or it can be the internal connection between two components. For ordinary technical personnel in this field, a specific meaning of the above term in the present disclosure can be understood through a specific circumstance.

The following is a further explanation of the present disclosure in combination with the drawings.

Embodiment

Figure 2:
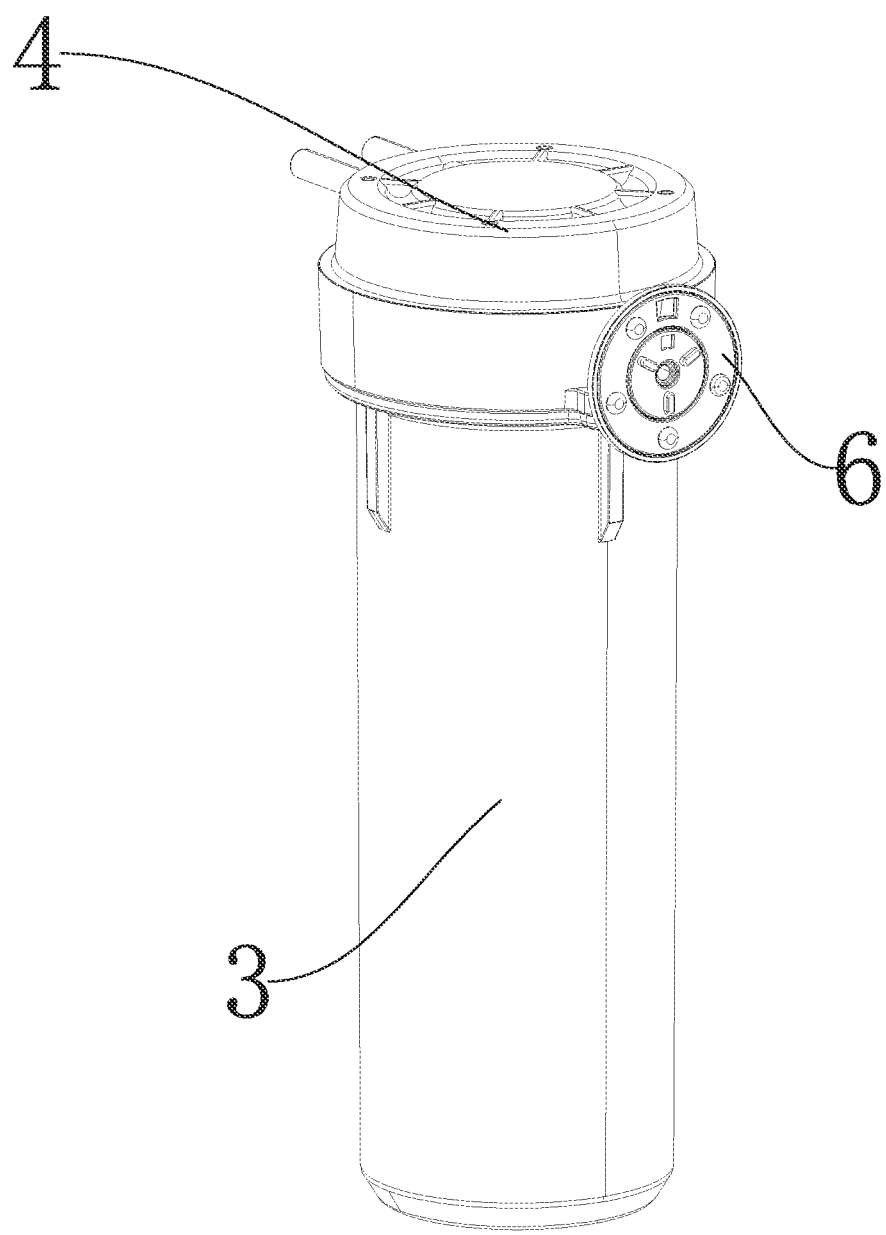
FIG. 2 is a schematic diagram of a matching structure of a first class filter element and a first class filter element mounting seat of the water purifier according to the present disclosure.
Figure 3:
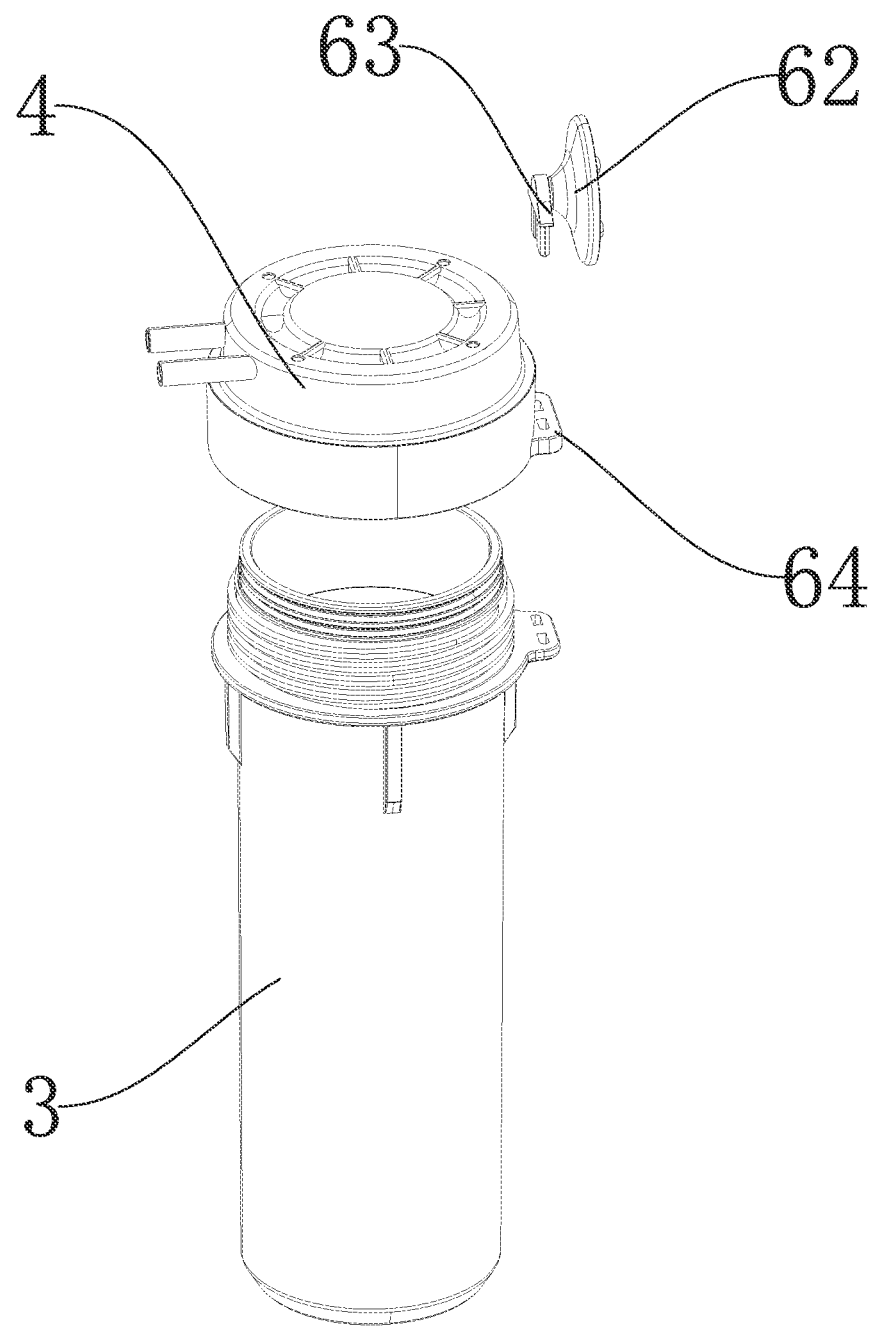
FIG. 3 is a schematic diagram of a decomposition structure of a locking block and a matching block of the water purifier according to the present disclosure.
Figure 4:
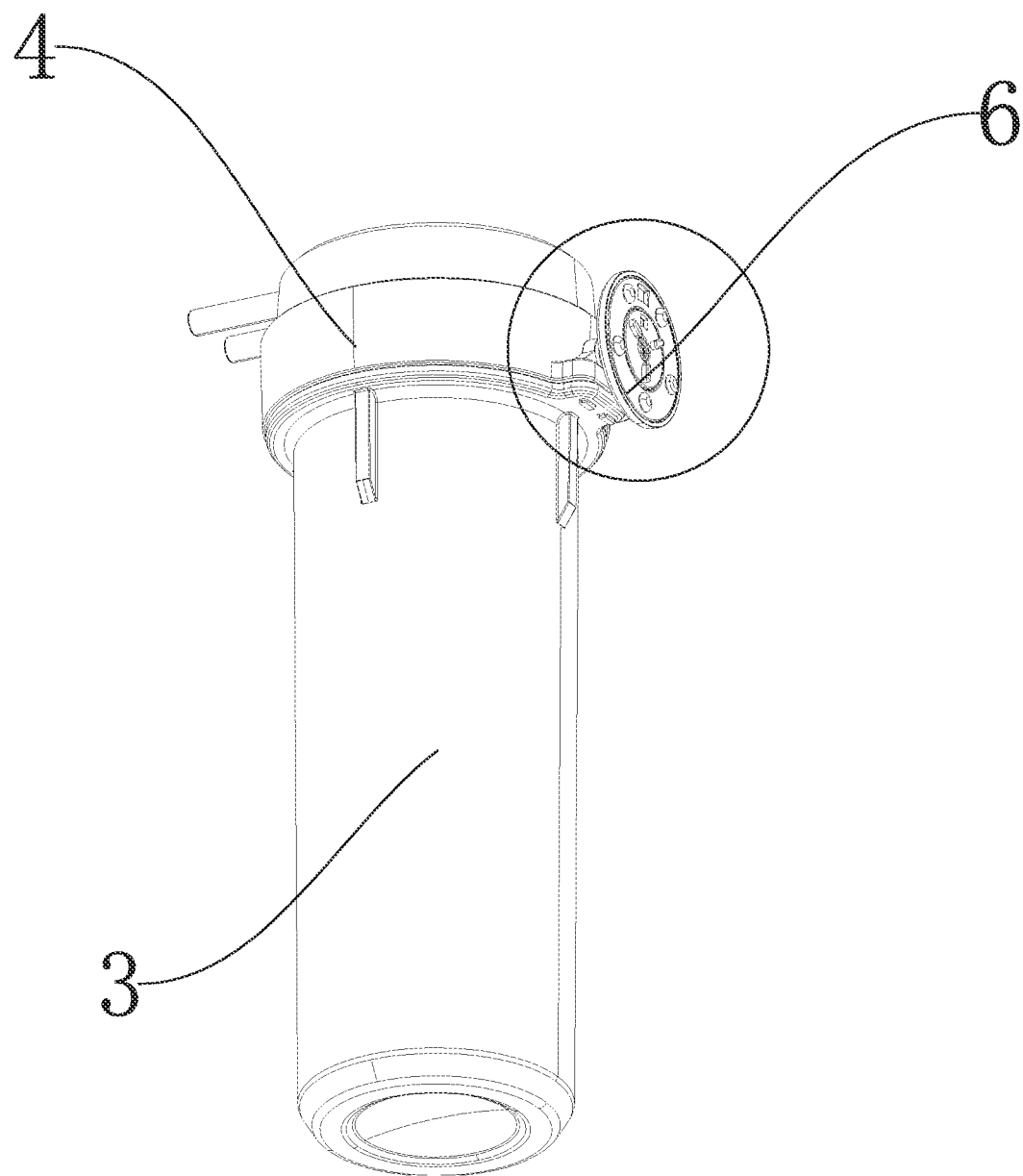
FIG. 4 is a schematic diagram of an installation structure of the locking block and the matching block of the water purifier according to the present disclosure.
Figure 5:
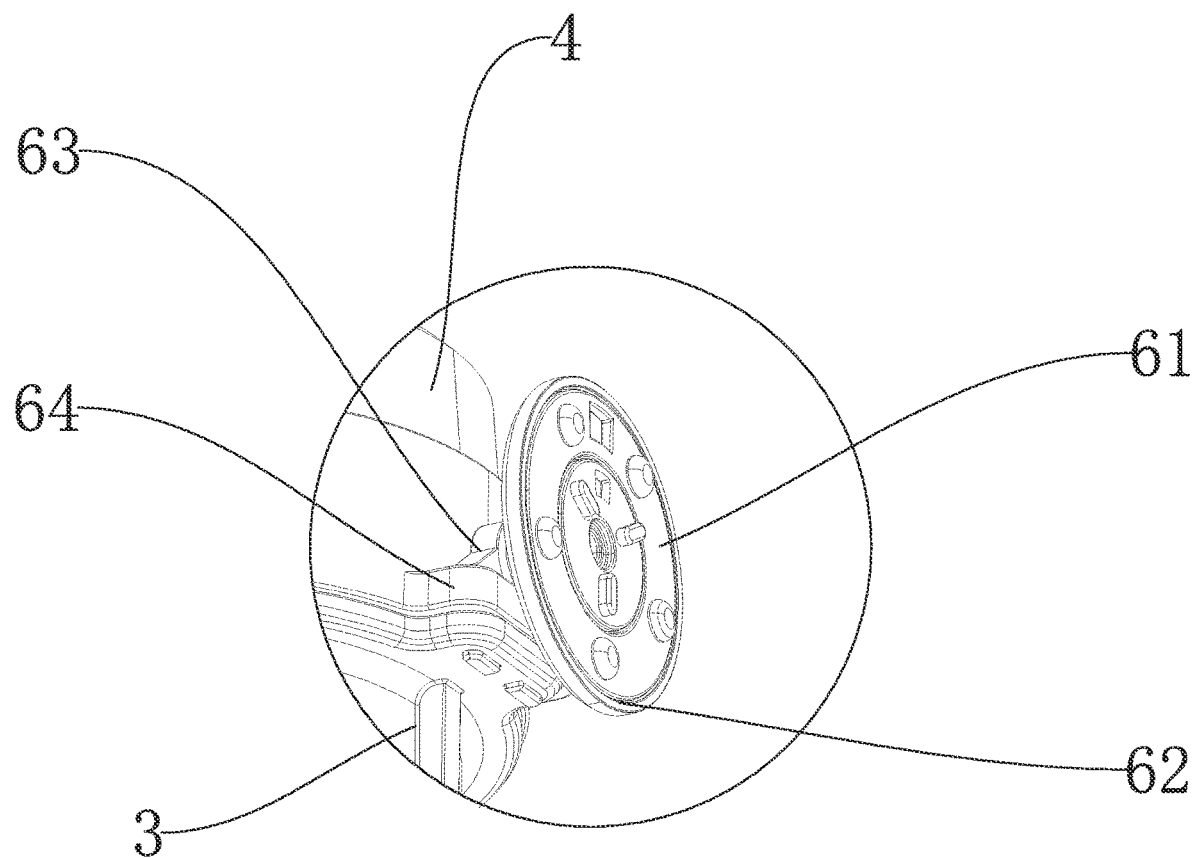
FIG. 5 is a schematic diagram of a prompt structure for replacing a filter element of a mechanical filter element of a water purifier according to the present disclosure.
Figure 6:
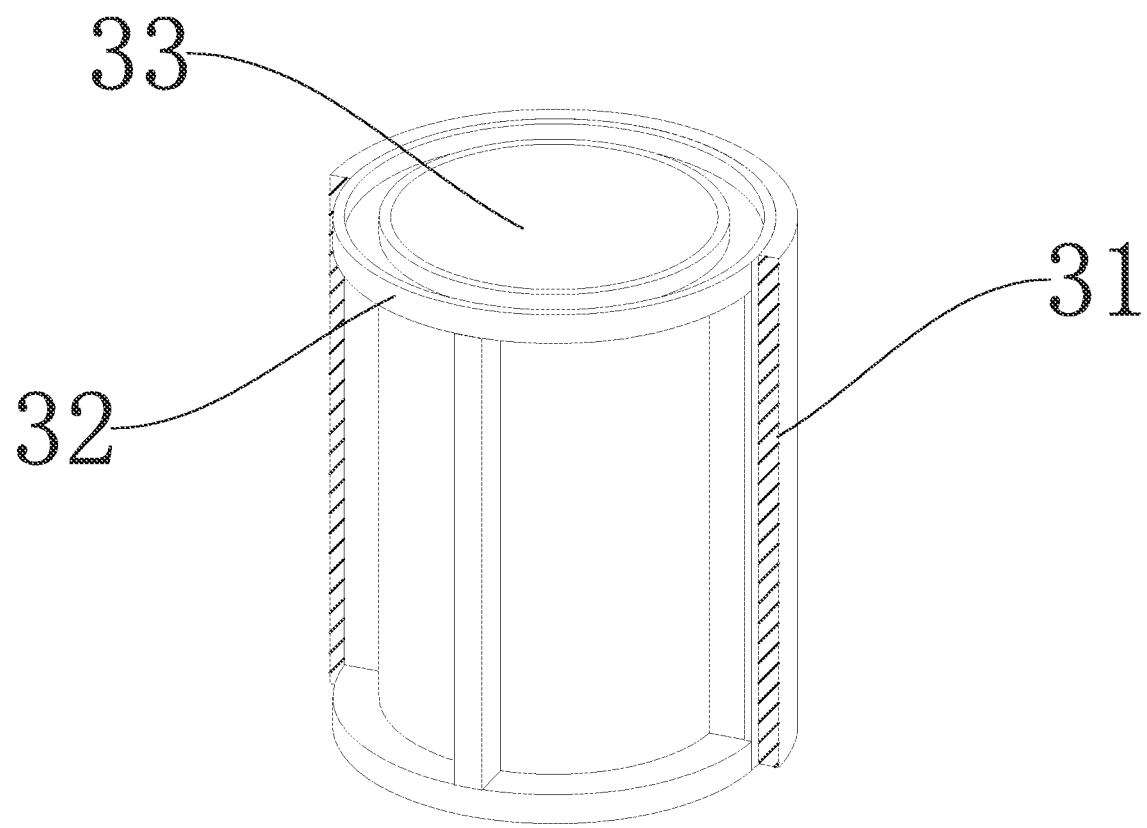
FIG. 6 is a schematic diagram of an internal structure of a widely matched membrane shell of a water purifier according to the present disclosure.

As shown in FIGS. 1 to 6, a water purifier includes a membrane shell 2 for installation and fixation, and a locking mechanism 6 for locking and preventing loosening of a first class filter element 3 and a second class filter element 5. A bottom surface of the membrane shell 2 is provided with two first class filter element mounting seats 4. The first class filter element 3 is connected to the first class filter element mounting seat 4 by threads. One side of the first class filter element mounting seat 4 is provided with a second class filter element mounting seat 7 penetrating a bottom of the membrane shell 2. A bottom of the second class filter element mounting seat 7 is provided with the second class filter element seat 5. An inner of the membrane shell 2 is provided with a fix groove 21 on one side of the second class filter element mounting seat 7. And an inner of the fix groove 21 is provided with a water pump 8.

Two first class filter elements 3 and the first class filter element mounting seat 4 are connected by the locking mechanism 6; the second class filter element mounting seat 7 and the second class filter element 5 are connected by the locking mechanism 6. The locking mechanism 6 includes a toggle disk 61, a fix block 62, and a locking block 63. A front end of the first class filter element 3 and a front end of the first class filter element mounting seat 4 are both formed with a matching block 64, and a hole is formed on the matching block 64 which fits with the locking block 63. A front end of the locking block 63 is provided with a fix block 62, and the toggle disk is rotatably connected to fix block 62.

In this embodiment, the first class filter element 3 includes a font composite filter element and a post carbon filter element, the second class filter element 5 includes a reverse osmosis membrane filter element, which is vertically installed on a side position of the membrane shell 2. By vertically installing the reverse osmosis membrane filter element on the side position of the membrane shell 2, a reserved space of the fix groove 21 can be used to install the water pump 8, which effectively saves an assembly space, improves a utilization rate of the overall space, and ensures a flatness and comfort of the overall structure during installation and use.

In this embodiment, the water pump 8 is connected to membrane shell 2 through a screw, and the second class filter element mounting seat 7 and the first class filter element mounting seat 4 are both connected to the water pump 8 through a pipeline.

In this embodiment, a length of the second class filter element 5 is longer than a length of the first class filter element 3. The second class filter element 5 often uses a RO reverse osmosis membrane, which limits its function and results in a longer length. Thus, in order to ensure an overall structural effect of the second class filter element 5 and the first class filter element 3, the second class filter element mounting seat 7 and the second class filter element 5 are fixed on the side position of the membrane shell 2, rendering an enough space for the water pump 8 to ensure an installation effect of the water pump 8, and ensuring a stability of the overall mechanism after the membrane shell 2 with the first class filter element 3 and the second class filter element 5.

In this embodiment, the locking block 63 is an insertion block provided with two vertical rods. The locking block 63 is inserted and interference-fit with the matching block 64. The fix block 62 and the locking block 63 are integrated formed. This setting adopts an interference-fit to ensure a close fit between the two matching blocks 64, avoiding looseness and leakage of the first class filter element 3 and the second class filter element 5 due to an internal water pressure.

In this embodiment, the toggle disk 61 is provided with a perspective window, and a position of the fix block 62 corresponds to the perspective window of the toggle disk 61 is provided with a scale. The toggle disk 61 and the fix block 62 are combined to adjust an installation date, which facilitates a visual understanding of the installation date during subsequent testing, thereby determining whether replacement is necessary, reducing costs and improving practicality.

In this embodiment, both the first class filter element 3 and the second class filter element 5 include a membrane shell 31 and an inner frame 32. The inner frame 32 is clamped inside the membrane shell 31, and an outer diameter of the inner frame 32 is the same as an inner diameter of the membrane shell 31. And an inner diameter of the inner frame 32 varies according to a size of a filter material 33. The inner frame 32 is a replaceable structure. Therefore, when facing different filter materials 33 (such as reverse osmosis membranes with models 2012, 3012, 3013, and 3213), inner frames 32 with different specifications can be replaced according to the size of filter material 33, and then fixed inside the membrane shell 31 of the same specification, improving the adaptability of the device to different filter materials 33, thereby enhancing the practicality of the device. (Changing different filter elements to reverse osmosis membrane element with different specifications)

A working principle of the water purifier: according to a required installation of the first class filter element 3 and the second class filter element 5, fixing the second class filter element 5 on the second class filter element mounting seat 7, installing the first class filter element 3 on the first class filter element mounting seat 4, after tightening, inserting the locking block 63 onto the matching blocks 64 at the front end of the first class filter element 3 and the second class filter element 5 to ensure a tight fit, avoiding loosening, and ensuring the sealing of the internal space, at the same time, due to the fix groove 21 formed inside the membrane shell 2 by the water pump 8, thereby effectively isolating from noise during an operation.

The above shows and describes the basic principle, main features, and advantages of the present disclosure. Technical personnel in the art should understand that the present disclosure is not limited by the above embodiments. The above embodiments and description only illustrate the principle of the present disclosure. Without departing from the spirit and scope of the present disclosure, there will be various changes and improvements in the present disclosure, which fall within the protection scope of the present disclosure.

What is claimed is:

1. A water purifier, comprising a membrane shell (2) for installation and fixation, and a locking mechanism (6) for locking and preventing loosening of a first class filter element (3) and a second class filter element (5);
   a bottom surface of the membrane shell (2) is provided with two first class filter element mounting seats (4), the first class filter element (3) is connected to the first class filter element mounting seat (4) by threads;
   one side of the first class filter element mounting seat (4) is provided with a second class filter element mounting seat (7) penetrating a bottom of the membrane shell (2); a bottom of the second class filter element mounting seat (7) is provided with the second class filter element seat (5); an inner of the membrane shell (2) is provided with a fix groove (21) on one side of the second class filter element mounting seat (7); and an inner of the fix groove (21) is provided with a water pump (8);
   two first class filter elements (3) and the first class filter element mounting seat (4) are connected by the locking mechanism (6); the second class filter element mounting seat (7) and the second class filter element (5) are connected by the locking mechanism (6);
   wherein, the locking mechanism (6) comprises a toggle disk (61), a fix block (62), and a locking block (63); a front end of the first class filter element (3) and a front end of the first class filter element mounting seat (4) are both formed with a matching block (64); a hole is formed on the matching block (64) which fits with the locking block (63); a front end of the locking block (63) is provided with the fix block (62), and the toggle disk (61) is rotatably connected to the fix block (62).

2. The water purifier according to claim 1, wherein, the first class filter element (3) comprises a front composite filter element and a post carbon filter element, the second class filter element (5) comprises a reverse osmosis membrane filter element, and the reverse osmosis membrane filter element is vertically installed on a side position of the membrane shell (2).

3. The water purifier according to claim 1, wherein, the water pump (8) is connected to the membrane shell (2) through a screw, and the second class filter element mounting seat (7) and the first class filter element mounting seat (4) are both connected to the water pump (8) through a pipeline.

4. The water purifier according to claim 1, wherein, a length of the second class filter element (5) is longer than a length of the first class filter element (3).

5. The water purifier according to claim 1, wherein the locking block (63) is an insertion block provided with two vertical rods, and the locking block (63) is inserted and interference-fit with the matching block (64), the fix block (62) and the locking block (63) are integrated formed.

6. The water purifier according to claim 1, wherein, the toggle disk (61) is provided with a perspective window, and a position the fix block (62) corresponds to the perspective window of the toggle disk (61) is provided with a scale.

7. The water purifier according to claim 2, wherein, both the first class filter element (3) and the second class filter element (5) comprise a membrane shell (31) and an inner frame (32), wherein the inner frame (32) is clamped inside the membrane shell (32), and an outer diameter of the inner frame (32) is the same as an inner diameter of the membrane shell (31), and an inner diameter of the inner frame (32) varies according to a size of a filter material (33).

* * * * *